(12) United States Patent
Rivoalen et al.

(10) Patent No.: US 12,149,580 B2
(45) Date of Patent: Nov. 19, 2024

(54) ADAPTIVE PROGRESSIVE DOWNLOADING OF A CONTENT BROADCAST IN REAL TIME ON A MOBILE RADIOCOMMUNICATION NETWORK, ASSOCIATED COMPUTER PROGRAM AND MULTIMEDIA-STREAM PLAYER TERMINAL

(71) Applicant: Orange, Issy-les-Moulineaux (FR)

(72) Inventors: Mathieu Rivoalen, Chatillon (FR); Hervé Marchand, Chatillon (FR)

(73) Assignee: Orange

( * ) Notice: Subject to any disclaimer, the term of this patent is extended or adjusted under 35 U.S.C. 154(b) by 0 days.

(21) Appl. No.: 17/746,718

(22) Filed: May 17, 2022

(65) Prior Publication Data
US 2022/0368755 A1 Nov. 17, 2022

(30) Foreign Application Priority Data
May 17, 2021 (FR) ...................................... 2105118

(51) Int. Cl.
*H04L 65/80* (2022.01)
*H04L 65/611* (2022.01)
*H04L 65/613* (2022.01)

(52) U.S. Cl.
CPC ............ *H04L 65/80* (2013.01); *H04L 65/611* (2022.05); *H04L 65/613* (2022.05)

(58) Field of Classification Search
CPC ....... H04L 65/80; H04L 65/611; H04L 65/613
See application file for complete search history.

(56) References Cited

U.S. PATENT DOCUMENTS

| | | | | |
|---|---|---|---|---|
| 8,437,257 | B2 * | 5/2013 | Pelletier | ............ H04W 72/1284 370/235 |
| 9,544,812 | B2 * | 1/2017 | Grinshpun | .......... H04L 43/0817 |
| 9,615,126 | B2 * | 4/2017 | Ramamurthy | ..... H04N 21/6175 |
| 9,860,830 | B2 * | 1/2018 | Lee | ........................ H04W 48/20 |
| 2003/0005187 | A1 * | 1/2003 | King-Smith | ............ H04L 12/56 710/12 |

(Continued)

FOREIGN PATENT DOCUMENTS

| | | | | |
|---|---|---|---|---|
| EP | | 2218294 B1 * | 12/2011 | ........ H04W 72/1284 |
| EP | | 3131338 B1 * | 1/2018 | ......... H04L 65/4076 |

(Continued)

OTHER PUBLICATIONS

Preliminary French Search Report for French Application No. FR 2105118, dated Nov. 23, 2021.
French Written Opinion for French registration No. FR2105118.

*Primary Examiner* — Oanh Duong
(74) *Attorney, Agent, or Firm* — Knobbe, Martens, Olson & Bear, LLP

(57) ABSTRACT

The adaptive progressive downloading of a content broadcast in real time on a radiocommunication network, implemented by a multimedia stream player terminal connected to the radiocommunication network is disclosed. A method implements, before playing the content, a configuration, according to at least one characteristic of the radiocommunication network, of a depth of buffer dedicated to the temporary storage of the content before playing, in the multimedia stream player terminal.

8 Claims, 1 Drawing Sheet

(56) References Cited

U.S. PATENT DOCUMENTS

| | | | |
|---|---|---|---|
| 2003/0023745 A1* | 1/2003 | Noe | H04L 67/53 709/224 |
| 2003/0198184 A1* | 10/2003 | Huang | H04L 47/10 370/231 |
| 2008/0005403 A1* | 1/2008 | Di Flora | G06F 9/45516 710/56 |
| 2010/0195602 A1* | 8/2010 | Kovvali | H04L 47/25 370/329 |
| 2015/0281303 A1 | 10/2015 | Yousef et al. | |
| 2016/0212054 A1 | 7/2016 | Howard et al. | |
| 2016/0241477 A1* | 8/2016 | Garcia | H04L 47/2425 |
| 2019/0014050 A1* | 1/2019 | Wang | H04L 49/9005 |
| 2019/0190856 A1 | 6/2019 | Fiaschi et al. | |
| 2020/0092786 A1* | 3/2020 | Lakshmanaswamy | H04W 28/0226 |
| 2021/0021895 A1* | 1/2021 | Li | H04N 21/4331 |

FOREIGN PATENT DOCUMENTS

| | | | | |
|---|---|---|---|---|
| FR | 3079095 | 6/2021 | | |
| FR | 3114720 | 4/2022 | | |
| WO | WO-2021162429 A1 * | 8/2021 | | G06F 3/162 |

\* cited by examiner

[Fig 1]
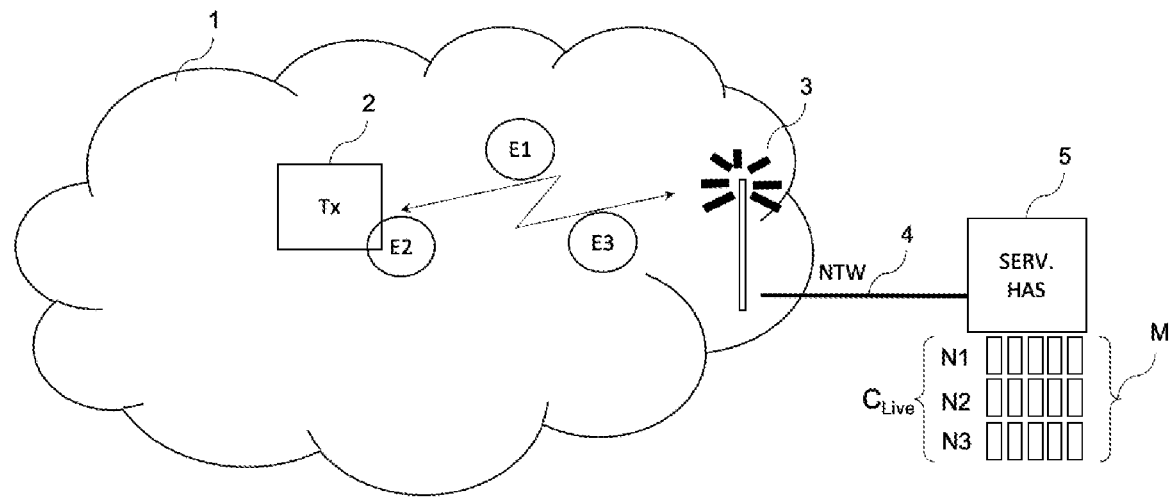
[Fig 2]
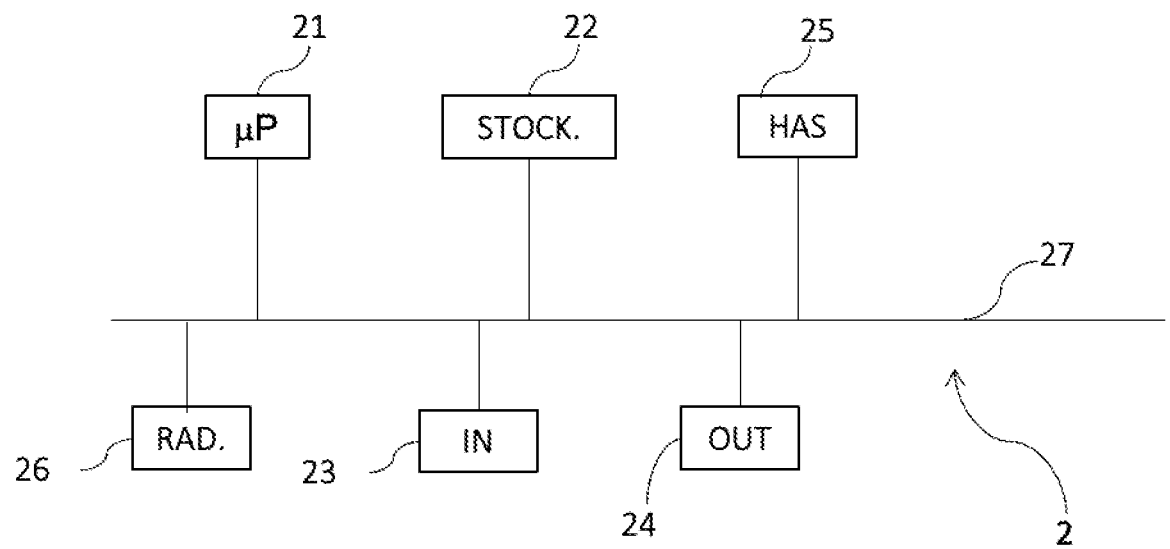

ADAPTIVE PROGRESSIVE DOWNLOADING OF A CONTENT BROADCAST IN REAL TIME ON A MOBILE RADIOCOMMUNICATION NETWORK, ASSOCIATED COMPUTER PROGRAM AND MULTIMEDIA-STREAM PLAYER TERMINAL

CROSS-REFERENCE TO RELATED APPLICATIONS

This application claims foreign priority to French Patent Application No. 2105118, entitled "ADAPTIVE PROGRESSIVE DOWNLOADING OF A CONTENT BROADCAST IN REAL TIME ON A MOBILE RADIOCOMMUNICATION NETWORK, ASSOCIATED COMPUTER PROGRAM AND MULTIMEDIA-STREAM PLAYER TERMINAL" and filed May 17, 2021, the content of which is incorporated by reference herein in its entirety.

BACKGROUND

Field

The field of the development is that of digital multimedia contents, namely digital audio and/or video contents, and in particular the so-called real-time (or live) contents associated with events that are taking place live. More precisely, the development relates to the adaptive progressive downloading of such real-time contents, on a radiocommunication network, for example a mobile radiocommunication network or a Wi-Fi® network.

Description of the Related Technology

Access to a multimedia content, such as on-demand television or video, is possible at the present time, for the majority of rendering terminals.

The terminal generally sends a request to a server, indicating the content selected, and in return receives a digital data stream relating to this content.

The terminal is adapted for receiving these digital contents in the form of multimedia data and to produce a rendering thereof. This rendering consists in providing the digital content at the terminal in a form accessible to the user. For example, received data corresponding to a video are generally decoded, and then rendered at the terminal in the form of a display of the corresponding video with its associated soundtrack. Hereinafter, for reasons of simplification, the digital content will be assimilated to a video and the rendering by the terminal or consumption by the user of the terminal, to a display on the screen of the terminal.

The broadcasting of digital contents is often based on client-server protocols in the HTTP family (from the English "Hyper Text Transport Protocol"). In particular, downloading of the digital contents in progressive mode, also referred to as streaming, makes it possible to transport and consume the data in real time, i.e., the digital data are transmitted over the network and reproduced by the terminal as they arrive. The terminal receives and stores some of the digital data in a buffer before reproducing them. This distribution mode is particularly useful when the transmission rate available to the user is not guaranteed for transferring the video in real time, according for example to the fluctuation of the available bandwidth.

This is because such a fluctuation may cause a variation in the latency over time, referred to as jitter. It should be stated that latency is defined, in a data transmission network, as the time necessary for a data packet to pass from the source to the destination through the network, i.e. the delay in transmitting the data. In order to compensate for the detrimental effects of jitter for the user, placing a buffer in the terminal reproducing the data streams received is known, wherein a certain number of data packets are stored, before the start of the rendering thereof to the user. This jitter buffer therefore causes a detectable delay at the start of the rendering of the stream.

Adaptive progressive downloading, or HTTP Adaptive Streaming, abbreviated to HAS, makes it possible in addition to broadcast and receive data according to various qualities corresponding for example to various transmission rates. These various qualities are described in a parameter file available in downloading on a data server, for example a content server. When the client terminal wishes to access a content, this description file makes it possible to select the correct format for the content to be consumed according to the available bandwidth or the storage and decoding capacities of the client terminal. This type of technique makes it possible in particular to take account of the variations in bandwidth on the connection between the client terminal and the content server.

There are several technical solutions for facilitating the distribution of such a content in streaming, such as for example the proprietary solutions Microsoft® Smooth Streaming, Apple® HLS, Adobe® HTTP Dynamic Streaming or the MPEG-DASH standard of the ISO/IEC organization. These methods propose to send to the client one or more intermediate description files, also referred to as documents or manifests, containing the addresses of the various segments with the various qualities of the multimedia content.

Thus the MPEG-DASH (standing for "Dynamic Adaptive Streaming over HTTP") standard is an internet audiovisual broadcasting format standard. It is based on the preparation of the content in various variable quality and transmission rate presentations, divided into segments of short duration (of the order of a few seconds), also referred to as "chunks". Each of these segments is made available individually by means of an exchange protocol. The protocol mainly targeted is the HTTP protocol, but other protocols (for example FTP) can also be used. The organization of the segments and the associated parameters are published in a manifest to the XML format.

The principle underlying this standard is that the MPEG-DASH client makes an estimation of the bandwidth available for receiving the segments and, according to the filling of his buffer, selects, for the next segment to be loaded, a representation the transmission rate of which:
provides the best possible quality,
and allows a reception delay compatible with the uninterrupted rendition of the content.

Thus, to adapt to the variation in network conditions, in particular in terms of bandwidth, the existing solutions of adaptive streaming enable the client terminal to change from a version of the content encoded at a certain rate, to another encoded at another rate, during the streaming. This is because each version of the content is divided into segments of the same duration. To allow a continuous reproduction of content on the terminal, each segment must reach the terminal before its programed instant of reproduction. The perceived quality associated with a segment increases with the size of the segment, expressed in bits, but in the same time, larger segments require a longer transmission time, and therefore have an increased risk of not being received in time for continuous reproduction of the content.

The reproduction terminal must therefore find a compromise between the overall quality of the content and the uninterrupted reproduction thereof, by carefully selecting the next segment to be downloaded, among the various encoding rates offered. To do this there are various algorithms for selecting the quality of the content according to the available bandwidth, which may present strategies that are aggressive to a greater or lesser extent, or secure to a greater or lesser extent.

The consumption of digital contents in adaptive progressive downloading (HAS) is tending to become widely accessible. It is in particular used by many streaming services (broadcasting in continuous mode, or reading continuously), but also by certain TV set top boxes, which use it for accessing delinearised contents, such as video on demand (VOD), the deferred broadcasting of television programs (Replay), or offers of the Network PVR type (standing for "Network Personal Video Recorder", i.e. a service for recording digital contents, implemented by the contents supplier himself rather than at the home of the end user).

In particular, accessing such digital contents broadcast in HAS from mobile telecommunication networks, of the 3G, 4G and now 5G type, is becoming more and more frequent, including when such contents are live, or real-time, contents, such as sporting events for example (football or rugby match, tennis tournament, etc.). For these live contents, it is always important to introduce a minimal delay between the real scene and what is broadcast on the screen, to avoid phenomena of video freeze, during which the image momentarily freezes on the screen of the reproduction terminal, which is particularly unpleasant for the user. This minimal delay is obtained by temporary storage, in the buffer of the user terminal, of segments of the video content, before they are played by the terminal.

This is because mobile communication networks are networks that are very heterogeneous in terms of radio transmission characteristics, and in particular in terms of available bandwidth, service quality, stability, or ping time, (i.e. the time taken for sending an accessibility request to equipment in the network, and receiving a response in return, or "round trip time"), which are fluctuating characteristics. Conventionally, the HAS players of the equipment connected to these mobile networks guard against these constraints by using a reception buffer, which leaves the player time to adapt (in particular by changing quality level of the segments or chunks downloaded) when high variations in access to the content occur (bandwidth collapsing, reception problem, ping time increasing, etc.). This strategy means that a long delay exists between the real scene that is being filmed (for example the football match) and what is reproduced on the screen: this time is conventionally several tens of seconds.

If the depth of the buffer is insufficient, the user will more or less frequently experience the inconvenience of seeing the image freeze on his screen (the video freeze phenomenon), which may be a particularly unpleasant experience if it occurs for example in full offensive action of his favorite team. It is therefore necessary for this depth to be correctly sized to avoid this poor user experience as far as possible.

However, excessively great depth of buffer causes a high offset in time between the actual occurrence of the real scene and its reproduction on the screen of the user terminal. This may also be a source of inconvenience for the user. This is because, in the context of a widely broadcast sporting event, for example the football World Cup, the user may view the event on his mobile terminal, through a mobile network of the 3G or 4G type for example, while his neighbor is watching the same match on his television, through the Digital Terrestrial Television (DTT) service. The offset in time between the real scene filmed and its reproduction on the terminal of the neighbor will be very much less than the one experienced by the mobile user, who may hear his neighbor react to the actions being viewed (goals, penalties, etc.) before even having seen himself on his screen.

It is therefore important, to improve the experience of the mobile user, to reduce as far as possible the depth of the buffer, to limit the offset in time of the reproduction of the live content compared with its occurrence in real time.

The same constraints are also encountered on the radiocommunication networks of the Wi-Fi® type, on which the fluctuations in the bandwidth or service-quality parameters may have an impact on the experience of the user, in particular in the case where he is viewing a content in real time.

There is therefore a need for a technique for the adaptive progressive downloading of digital contents on a radiocommunication network (mobile or Wi-Fi for example), that makes it possible to achieve an optimized compromise between these two constraints.

In another context, a related problem has already been studied by the Applicant in the patent application FR 3 079 095, published on 20 Sep. 2019. In this application, the problem considered is that of a local communication network, for example a domestic network, in which a user accesses a content with a high jitter constraint, such as an online video game service. The solution proposed in this application is based on a dual mechanism of prioritizing a video stream broadcast continuously, at a gateway for access to a local area network, and of configuring the depth of the buffer of a terminal reproducing this stream, in order to enable the video stream to be played continuously without blocking at the rendering terminal, and thus to improve the experience of the user.

Though this solution has the common point with the present development of being concerned with the configuration of the depth of the buffer of the rendering terminal, it differs greatly therefrom through the type of multimedia stream concerned (online video game stream versus video stream broadcast live).

SUMMARY

The development meets the requirement mentioned above by proposing a method for the adaptive progressive downloading of a content broadcast in real time on a radiocommunication network. Such a method is implemented by a multimedia-stream player terminal connected to the radiocommunication network.

According to one embodiment of the development, such a method implements, before playing the content:
  a configuration, according to at least one characteristic of the radiocommunication network, of a buffer depth dedicated to the temporary storage of the content before playing, within the multimedia-stream player terminal.

Thus the development is based on an entirely novel and inventive approach of the adaptive progressive downloading of multimedia contents in real time in a radiocommunication network. This is because, whereas, according to the techniques of the prior art, in such a context, the depth of the buffer of the reproduction terminal is configured once and for all, at the commissioning of the terminal, the method according to the development on the contrary proposes adapting it according to the characteristics of the radiocommunication network used for the HAS downloading (e.g. the transmission characteristics of a mobile network). This proves to be particularly advantageous for mobile equipment that, according to the circumstances and according to its movements, can sometimes connect to a 5G mobile network, which allows very high data rates and a low latency, and sometimes to a mobile network of the 3G type, which offers much lower transmission rates, and much greater latency.

The 5G mobile network is for example optimized in terms of bandwidth and reduction in ping time, compared with the 3G network. This optimization makes it possible to be able to access the HAS segments more reliably and more quickly. On this type of mobile communication network, the reception buffer can therefore have a much smaller depth, without risking encountering problems of video freeze.

According to the technique of the development, it is possible to optimize the user experience in all circumstances, whatever the characteristics of the radiocommunication network to which it is connected.

It will be noted that the size, or depth, of the buffer is determined at the start of the playing of the content, and cannot be increased during the playing. The characteristics of the radiocommunication network are therefore information available at the moment of the initiation of the playing.

According to a first aspect, these characteristics of the radiocommunication network, in particular in the case of a mobile network, are a type of bearer network. Thus the HAS player configures the depth of its buffer according to the information related to the bearer mobile (3G, 4G or 5G) to which the user equipment is connected.

Advantageously, a type of bearer network is associated with a range of configuration values of the depth of the buffer.

For example, if the terminal determines that it is connected to a 3G network, the depth of its buffer will have to be configured to a value of between 10 s and 30 s; for a 5G network, the depth of the buffer can be configured at between 2 s and 15 s.

It will be noted that here the depth of the buffer is expressed in seconds: a buffer with a depth of 10 s makes it possible to store a number of content segments, or chunks, corresponding to 10 s of content (for example, five chunks with a duration each of 2 s).

According to a second aspect, the characteristic or characteristics of the radiocommunication network is/are a signal quality level received by the multimedia stream player terminal, for example a mean received power value of a reference signal (RSRP).

Thus the HAS player bases the configuration of the depth of its buffer on the signal level measured. This is because, in the case of a mobile network for example, it is possible to establish a theoretical quality of the mobile signal, according to the RSRP. In the LTE standards (standing for "Long Term Evolution"—3GPP 36.xxx standards), the RSRP (standing for "Reference Signal Received Power") is the standardized measurement of the power of the received signal that the terminal sends to the base station. This RSRP measurement can vary between −44 dBm and −140 dBm. This RSRP measurement is therefore a good indicator of quality of the mobile signal, on which it is advantageous to base the configuration of the buffer depth. It should be noted that, in a variant, other indicators such as the RSSI (measurement of the received power level, "Received Signal Strength Indication"), the SNR ("Signal To Noise Ratio") or the RSRQ ("Reference Signal Received Quality") could also be used, in particular in the case of a Wi-Fi radiocommunication network.

In one embodiment, the received signal quality level is associated with a configuration value of the buffer depth, selected within the range of values associated with the bearer network type.

Thus the received signal quality level can make it possible to refine the selection of the depth of the buffer, within the preference value range associated with the mobile bearer type. As indicated above, the measurement of the RSRP can make it possible to estimate the theoretical quality of the mobile signal, for example according to four levels termed from poor to excellent. Thus, for a terminal connected to a 3G network, for which the buffer depth is preferably selected between 10 s and 30 s, the multimedia stream player terminal will configure this size at 10 s if the measurement of the RSRP makes it possible to estimate that the quality of the mobile signal is excellent (the highest quality level), but at 30 s if this measurement indicates that the quality of the mobile signal is poor (the least high quality level).

In a variant, another characteristic of the radiocommunication network can be the transmission frequency of the data in the network.

Preferably, the type of bearer network is known to the multimedia stream player terminal, or transmitted to the terminal by a content server, on request to download the content.

This is because this information is known to the terminal when it is installed in mobile communication equipment of the smartphone or tablet type. When the HAS player is integrated in a multimedia stream player terminal of the HDMI key type (for example Chromecast® from Google® or Clé TV® from Orange®), which can for example be connected in Wi-Fi® to a residential gateway connected to the mobile communication network (for example 4G Livebox® from Orange®), this information can in this case be supplied by the HAS server, to which it is sent to obtain the manifest file associated with the multimedia stream to be viewed.

The development also relates to a multimedia stream reader terminal, connected to a radiocommunication network (mobile or Wi-Fi®), configured to implement an adaptive progressive downloading of a content broadcast in real time on said network. Such a terminal comprises a processor configured for implementing, before playing the content.—a configuration, according to at least one characteristic of the radiocommunication network, of a buffer depth dedicated to the temporary storage of the content before playing, in the multimedia stream player terminal.

According to an advantageous embodiment of the development, such a processor is also configured for implementing the steps of the adaptive progressive downloading method described previously.

The development also relates to a computer program product comprising program code instructions for implementing a method as described previously, when it is executed by a processor.

The development also relates to a recording medium that can be read by a computer on which a computer program is recorded comprising program code instructions for executing the steps of the adaptive progressive downloading method according to the development as described above.

Such a recording medium may be any entity or device capable of storing the program. For example, the medium may include a storage means, such as a ROM, for example a CD ROM or a microelectronic circuit ROM, or a magnetic recording means, for example a USB key or a hard disk.

Moreover, such a recording medium may be a transmissible medium such as an electrical or optical signal, which can be conveyed via an electrical or optical cable, by radio or by other means, so that the computer program that it contains can be executed remotely. The program according to the development may in particular be downloaded on a network, for example the internet.

Alternatively, the recording medium may be an integrated circuit wherein the program is incorporated, the circuit being adapted for executing or for being used in the execution of the aforementioned adaptive progressive downloading method.

The aforementioned corresponding terminal, computer program and recording medium have in combination all or some of the features disclosed in the whole of this document, and have at least the same advantages as those conferred by the adaptive progressive downloading method according to the present development.

BRIEF DESCRIPTION OF THE DRAWINGS

Other aims, features and advantages of the development will emerge more clearly from the reading of the following description, given by way of simple illustrative and non-limitative example, in relation to the figures, among which:

FIG. 1 presents, in simplified block diagram form, the general principle of the adaptive progressive downloading technique according to one embodiment of the development;

FIG. 2 illustrates the hardware structure of a terminal for rendering a video stream in continuous mode of the mobile network of FIG. 1.

DETAILED DESCRIPTION OF CERTAIN ILLUSTRATIVE EMBODIMENTS

The general principle of the development is based on the configuration, according to characteristics of a radiocommunication network to which a user terminal is connected, of a buffer depth of the terminal, wherein segments of a content broadcast in real time are stored, before reproduction by the terminal. It is thus possible to implement a fine optimization of the size of the buffer according to the characteristics of the network to which the terminal is connected, and thus to obtain the best compromise between a buffer that is sufficiently deep to avoid the phenomena of video freeze, and a buffer that is sufficiently small to reduce as far as possible the offset in time between the real event that is the object of the live content and the rendering thereof by the user terminal.

The general principle of the technique of adaptive progressive downloading according to one embodiment of the development will now be presented in relation to FIG. 1. A mobile communication network 1 is considered by way of example, which may be of the 3G, 4G or 5G type for example, or in accordance with any other future evolution of the mobile radiocommunication standards. In a variant, the radiocommunication network is a network of the Wi-Fi® type.

A user terminal Tx 2 is considered, which is connected to this mobile network 1. This terminal is a multimedia stream player, able to obtain the adaptive progressive downloading in HAS mode of a content, from a HAS 5 server, and to control the rendering thereof to a user, on an integrated screen of the terminal Tx 2, or on an offset screen. The terminal Tx 2 may be an item of mobile radiocommunication equipment, such as a smartphone, directly connected to the network 1, and equipped with an HAS player. The terminal Tx 2 may also correspond to the association of a plurality of distinct items of equipment, namely a multimedia stream player terminal (for example the Clé TV® from Orange®), which renders a content on the screen of a television of a local domestic network, and a residential gateway equipped with a mobile radiocommunication module (for example 4G Livebox® from Orange®), which is connected to the mobile network 1.

In all cases, the terminal Tx 2 is configured for sending a request for adaptive progressive downloading of a content to the HAS server 5, to obtain the downloading of the various segments or chunks of this content, to store them temporarily in a buffer, and to implement the reproduction thereof to the user.

To do this, the terminal Tx 2 is connected to a base station 3 of the mobile network 1, located in its radio coverage area. The base station 3 is for example connected to the HAS content server 5 by a terrestrial communication network NTW 4, for example an optical fiber communication network.

The HAS server 5 receives for example strings of digital television content coming from a broadcast television network, not shown, and/or videos on demand, and makes them available to the client terminals. The concern is more particularly, in the context of the present application, with live contents $C_{Live}$, i.e. with the contents corresponding to events that are taking place in real time and are made available for downloading in real time also, for example sporting events or news contents. The technique of the development can of course also be applied to any other type of non-real-time content, but is in particular advantageous for so-called live contents. The concern hereinafter is therefore with the latter.

Conventionally, various qualities can be encoded for the same content $C_{Live}$, corresponding for example to various bit rates. More generally, quality will be spoken of to refer to a certain resolution of the digital content (spatial or temporal resolution, quality level associated with the video and/or audio compression) with a certain coding rate. Each quality level N1, N2, N3, . . . is itself divided on the contents server 5 into time segments (or content fragments or chunks, these three words being used indifferently in the whole of this document).

The description of these various qualities N1, N2, N3, etc. and of the associated temporal segmentation, as well as the content fragments, are described for the client terminal and made available to him via their internet addresses (URI: Universal Resource Identifier). All these parameters (qualities, addresses of fragments, etc.) are in general grouped together in a parameter file, referred to as a description file M. It should be noted that this parameter file may be a computer file or a set of information descriptive of the content, accessible at a certain address.

In a context of progressive adaptive downloading, the terminal Tx 2 can adapt its requests for receiving and decoding the content Cu, requested by the user to the quality that best corresponds to it. For example, if the content Cu, is available at the apparent bit rates 512 kb/s (kilobits per second) (Resolution 1, or level 1, denoted N1), 1024 kb/s (N2), 2048 kb/s (N3) and the Tx client terminal 2 has a bandwidth of 3000 kb/s, it can request the content at any rate less than this limit, for example 2048 kb/s. Generally, "$C_{Live}$@Nj" denotes the content Cu, with the quality j (for example the $j^{th}$ quality level Nj described in the description file M.

Mobile networks, such as the mobile network 1, are very heterogeneous networks on which the bandwidth, the service quality, the stability or the ping time are very different. Conventionally, the HAS players of the equipment connected to these mobile networks guard against these constraints by applying a reception buffer, in which the fragments of the content are stored before they are rendered to the user, which leaves the time for the multimedia stream player to adapt when high variations in access to the content occur (bandwidth that collapses, reception problem, ping time increasing, etc.). This strategy means a long delay exists between the real (or live) scene that is being filmed and what is reproduced on the screen. This delay is conventionally of several tens of seconds.

If this buffer is not correctly sized, the user may more or less frequently suffer, according to the type of mobile network 1 to which he is connected, video freeze phenomena, during which the image temporarily freezes on the screen.

However, the development of mobile telecommunication technologies over time allows substantial gains, both in terms of data transmission rate, and also now latency. Thus the advent of 4G networks has made it possible, compared with 3G networks, to significantly improve the data transmission rate on the network, and therefore to achieve higher content quality levels. The advent of 5G networks now affords drastic latency gains, because of the increase in frequency, and therefore the reduction in the distance between the terminal Tx 2 and the antenna of the base station 3.

This is because the 5G mobile network is for example optimized for the bandwidth but also for significantly reducing the ping time. This optimization makes it possible to be able to access the HAS segments more reliably and more quickly. On this type of network, the reception buffer can therefore have a lesser depth than for a 3G or 4G network for example, without risking encountering problems of video freeze.

Thus, when the Tx user terminal 2 wishes to access a content $C_{Live}$, it commences, during a step E1, by determining one or more characteristics of the mobile network 1 to which it is connected, and this before commencing to play the content $C_{Live}$.

information can be transmitted to the terminal Tx 2 by the HAS server 5. This is because, when the terminal Tx 2 sends to the HAS server 5 a request for recovering a multimedia stream corresponding to the content $C_{Live}$, and the associated manifest file M, the HAS server 5 can identify from which type of mobile network 1 this client request comes, and therefore return this information to the terminal Tx 2.

In this embodiment, each type of bearer network is associated with a range of reception buffer depth values. This is because each type of bearer network is in principle associated with a theoretical ping time, for example:
  for a 3G network, the ping time is approximately 200 ms;
  for a 4G network, the ping time is approximately 100 ms;
  for a 5G network, the ping time announced is approximately 5 ms.

However, if the data transmission rate is in principle high for the 4G and 5G networks, it is lower for 3G networks.

It is thus possible to provide buffer depths, expressed in seconds, lying:
  between 10 s and 30 s for a 3G bearer network;
  between 6 s and 20 s for a 4G bearer network;
  between 2 s and 15 s for a 5G bearer network.

In this preferential embodiment, the terminal Tx 2 also determines a received signal quality level, which is based for example on the RSRP (standing for "Reference Signal Received Power").

In the LTE standards (standing for "Long Term Evolution", namely the 3GPP 36.xxx standards), the RSRP is the standardized measurement of the power of the received signal, which the terminal sends to the base station; it may vary between −44 dBm and −140 dBm.

Thus the received signal quality level can be termed:
  excellent if RSRP>−84 dBm (provided that the SNR "Signal-to-noise ratio" is also very good, i.e. >20 dB);
  good for an RSRP of between −85 dBm and −102 dBm;
  fair for an RSRP of between −103 dBm and −111 dBm (this is in particular the limit for doing 2×2 MIMO (standing for "Multiple Input Multiple Output"));
  poor for an RSRP below −112 dBm: it is then possible to receive, but with a lower bit rate.

Table 1 below summarizes, by way of example, the statistics relating to the transmission characteristics of a 4G LTE network.

TABLE 1

| RSRP (dBm) | RSRQ (dB) | SINR (dB) | Evaluation | Expected connectivity |
|---|---|---|---|---|
| >−84 | >−5 | >12.5 | Excellent | Fast speeds without loss |
| −85 to −102 | −5 to −9 | 12 to 10 | Good | Fast speeds without loss |
| −103 to −111 | −9 to −12 | 10 to 7 | Fair | Normally, no problem, longer latency, correct but useful and reliable data rates can be achieved |
| <−112 | <−12 | <7 | Poor | Considerably reduced data speeds, regular disconnections. Possible connection problems. |

These characteristics can be determined on the basis of the type of bearer network used (e.g. 3G, 4G or 5G), and/or on the quality of the mobile signal exchanged between the terminal Tx 2 and the base station 3, evaluated from a known quality indicator such as the RSSI or the SNR for example.

In a preferential embodiment, the terminal Tx 2 first of all determines the type of bearer network associated with the mobile network 1. If the terminal Tx 2 is a mobile telephone, a tablet or a smartphone, the type of bearer is information that it knows. If the terminal Tx 2 is for example a multimedia stream player terminal connected in Wi-Fi® to a residential gateway equipped with a radio module, this In the above table, SINR designates the signal-to-interference plus noise ratio.

It will be recalled that the RSSI indicator (standing for "Received Signal Strength Indicator") is an indication of the power of the received signal. This is however not a very significant measurement for a 4G bearer network. This is because the RSSI is a measurement of the mean total power received from the transporter, and includes the power of the cells serving and not serving the channel, the interference in the adjacent channel, the thermal noise, etc.

The RSRP indicator for its part is the reference signal of the received power, and constitutes a type of RSSI measurement. In simple terms, the RSRP measures solely the usable part of the signal, which is in fact a more precise measurement than the RSSI, since it includes the interference and the noise on the connected network. The value of the RSRP will generally be a value lower than the RSSI by approximately −20 dBm. The RSRP is the main parameter used for classifying the various candidate cells according to the strength of their signal.

Finally, the RSRQ indicator gives information about the quality of the reference signal received. It is used as supplementary information for taking a reliable decision on transfer or selection of a cell when the RSRP is not sufficient. Then RSRQ=RSRP/RSSI.

In a preferential embodiment of the development, the terminal Tx 2 therefore uses the value of the RSRP to refine the configuration of the depth of its buffer, and to select a suitable value, within the range of preferential values dictated by the type of mobile bearer network of the network 1.

Table 2 below indicates the depth of buffer that must be adopted by the terminal Tx 2, according firstly to the type of mobile bearer (in columns 3G, 4G or 5G), and secondly on the quality level of the received signal (in rows, excellent, good, fair or poor, according to the value of the RSRP).

TABLE 2

| | Bearer\Quality of Signal | | |
|---|---|---|---|
| | 3 G | 4 G | 5 G |
| Excellent | 10 s | 6 s | 2 s |
| Good | 12 s | 8 s | 3 s |
| Fair | 15 s | 10 s | 5 s |
| Poor | 30 s | 20 s | 15 s |

Thus, if the terminal Tx 2 determines, during step E1, that the mobile network 1 is a 4G network and that the RSRP is −106 dBm, the quality of the signal can therefore be termed "fair", and it is desirable, during a step E2, to fix the depth of the buffer at 10 s. There will therefore be a time offset of 10 seconds between the occurrence with the real event that is the subject of the content Cu, and the reproduction thereof on the screen of the terminal Tx 2.

If on the other hand the terminal Tx 2 determines, during step E1, that the mobile network 1 is a 5G mobile network and the RSRP is −90 dBm, the quality of the signal can therefore be termed "good", and the depth of the buffer can be reduced to 3 s during the step E2. The time offset between the occurrence of the real event that is the subject of the content $C_{Live}$ and the reproduction thereof on the screen of the terminal Tx 2 can advantageously be reduced to 3 s, without risking any phenomenon of video freeze.

Thus the better the characteristics of the mobile network 1 in terms of ping time, bandwidth and stability, the more the size of the reception buffer can be reduced.

In a variant, the terminal Tx 2 can also take account of the frequency of the data signal exchanged with the base station 3, to further refine the selection of the optimal depth of the buffer. This is because this frequency also supplies information to the terminal Tx 2 on the data rate available, which can be used for "customizing" even further the size of the reception buffer.

After optimal configuration of the depth of the buffer during step E2, the terminal Tx 2 can, during a step E3, access the various chunks of the content $C_{Live}$, available from the HAS server 5. Conventionally, the terminal Tx 2 determines in advance, on the basis of the manifest file M supplied by the HAS server 5, the quality level N1, N2 or N3 of the segments for which it can claim to take account of the available bandwidth, and requests the downloading of the segments to render them for the user. On reception of the segments requested, le terminal Tx 2 stores them temporarily in the reception buffer, and then initiates playing thereof, i.e. reproduction thereof to the user.

The hardware structure of a terminal for rendering a video stream broadcast continuously is now presented, in relation to FIG. 2, according to one embodiment of the development, for example the smartphone Tx 2 in FIG. 1. Such a terminal comprises in particular a unit for controlling the depth of a buffer, wherein the packets of the video data stream are temporarily stored before rendering thereof for the user.

The term unit can correspond both to a software component and to a hardware component or a set of hardware and software components, a software component itself corresponding to one or more computer programs or sub-programs or more generally to any element of a program able to implement a function or a set of functions.

The multimedia stream player terminal 2 in FIG. 2 comprises a processor 21, a storage unit 22, an input device 23, an output device 24, an HAS player 25 and a radio module 26, which are connected to each other by a bus 27. Naturally the elements constituting the terminal 2 can be connected to each other by any other type of connection, instead of the bus 27. Such a terminal 2 is for example a smartphone, a tablet or an assembly comprising a HDMI key equipped with an HAS player, a residential gateway equipped with a radiocommunication module, and a television screen.

The processor 21 controls the operation of the terminal 2. The storage unit 22 stores at least one computer program, intended to be executed by the processor 21, and various data, including those in Table 2 making it possible to select the optimum buffer depth according to the current transmission characteristics, as well as various parameters necessary for the operations implemented by the processor 21. The storage unit 22 can in particular contain the buffer, the depth of which can be configured according to an embodiment of the development, and which is intended to temporarily store the packets of the video data stream received from the HAS server 5, before rendering thereof for the user.

The processor 21 can be produced in hardware or software form, or in the form of a hardware and software combination. For example, the processor 21 can be designed in the form of a dedicated hardware component, such as an integrated circuit, or a programmable processing unit of the CPU ("Central Processing Unit") type that executes a computer program stored in memory.

The storage unit 22 can take any form adapted to the storage of a program or of data that can be read by computer, for example a computer-readable storage means such as a semiconductor memory, or a magnetic, optical or magneto-optical recording means, loaded in a unit accessible in read/write mode.

The program causes the implementation by the processor 21 of various actions, including:
  determining the characteristics of the network 1 to which the terminal is connected, by means of the radio module 26;
  configuring the buffer contained in the storage unit 22, according to the determined characteristics of the network;
  downloading, by the HAS module 25, the content segments available from the HAS content server 5 in FIG. 1, and temporary storage thereof in the buffer of the storage unit 22;

reproducing the content for the user, by the conjoint action of the HAS module 25 and of the output device 24.

The input device 23 can take the form of a keypad, a remote control, or any other form enabling a user to enter commands or actions relating to the video stream broadcast continuously. The output device 24 can take the form of a screen for displaying the video stream reproduced, or a screen for controlling commands entered by the user.

Although a single processor 21 has been shown in FIG. 2, this processor may comprise various modules and units, implementing the functions of the terminal 2, according to the embodiments of the present patent application, such as:

- a module for determining the characteristics of the network 1 to which the terminal 2 is connected by means of the radio module 26;
- a module for configuring the depth of the buffer;
- a unit for decoding the video stream before rendering.

These various modules and units can also be embedded in several processors 21 communicating and cooperating with each other.

FIG. 2 illustrates solely a particular manner, among several possible ones, of implementing the terminal 2, so that it implements the steps of the method detailed above, in relation to FIG. 1. This is because these steps may be implemented either on a reprogrammable computing machine (a PC computer, a DSP processor or a microcontroller) executing a program comprising a sequence of instructions, or on a dedicated computing machine (for example a set of logic gates such as an FPGA or ASIC, or any other hardware module).

In the case where the terminal 2 is implemented with a reprogrammable computing machine, the corresponding program (i.e. the sequence of instructions) can be stored in a removable storage medium (such as for example a diskette, a CD-ROM or a DVD-ROM) or not, this storage medium being partially or totally readable by a computer or a processor.

The invention claimed is:

1. A method of adaptive progressive downloading of a content broadcast in real time on a radiocommunication network, the method being implemented by a multimedia stream player terminal connected to the radiocommunication network, the method comprising, before playing the content:
    - determining at least one characteristic of the radiocommunication network, the at least one characteristic of the radiocommunication network comprises a type of bearer network,
    - at a start of playing of the content in the multimedia stream player terminal, configuring according to the at least one characteristic of the radiocommunication network, a depth of buffer dedicated to the temporary storage of the content,
    - an adaptive progressive downloading of the content in real time, and
    - a temporary storing of the adaptive progressive downloaded content in the buffer,
    - and the method further comprising, during the playing of the content, maintain constant the depth of the buffer.

2. The adaptive progressive downloading method according to claim 1, wherein the type of bearer network is associated with a range of configuration values of the buffer depth.

3. The adaptive progressive downloading method according to claim 1, wherein the at least one characteristic of the radiocommunication network comprises a signal quality level received by the multimedia stream player terminal.

4. The adaptive progressive downloading method according to claim 3, wherein the type of bearer network is associated with a range of configuration values of the buffer depth and wherein the received signal quality level is associated with a configuration value of the buffer depth, selected within the range of values associated with the type of bearer network.

5. The adaptive progressive downloading method according to claim 3, wherein the received signal quality level is a mean received power value of a reference signal.

6. The adaptive progressive downloading method according to claim 1, wherein the type of bearer network is known to the multimedia stream player terminal, or transmitted to the terminal by a content server, on request for downloading the content.

7. A multimedia stream player terminal, connected to a radiocommunication network, configured for an adaptive progressive downloading of a content broadcast in real time on the radiocommunication network, the multimedia stream player terminal comprising a processor to implement, before playing the content:
    - a determination of at least one characteristic of the radiocommunication network, the at least one characteristic of the radiocommunication network comprises a type of bearer network,
    - at a start of playing of the content in the multimedia stream player terminal, a configuration, according to the at least one characteristic of the radiocommunication network, of a depth of a buffer memory dedicated to the temporary storage of the content,
    - an adaptive progressive downloading of the content in real time,
    - a temporary storing of the adaptive progressive downloaded content in the buffer,
    - a determination at the start of the playing of the content of the depth of the buffer, and
    - maintaining constant the depth of the buffer during the playing of the content.

8. A processing circuit comprising a processor and a memory, the memory storing program code instructions of a computer program for implementing the method according to claim 1, when the computer program is executed by the processor.

* * * * *